US009274996B2

(12) United States Patent
Bisht et al.

(10) Patent No.: US 9,274,996 B2
(45) Date of Patent: Mar. 1, 2016

(54) METHOD FOR FILTERING CACHED INPUT/OUTPUT DATA BASED ON DATA GENERATION/CONSUMPTION

(71) Applicant: Samsung Electronics Co., Ltd., Suwon-si, Gyeonggi-do (KR)

(72) Inventors: Pradeep Bisht, Mountain View, CA (US); Jiurong Cheng, Milpitas, CA (US); Jay H. Martinez, Los Gatos, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 14/690,365

(22) Filed: Apr. 17, 2015

(65) Prior Publication Data

US 2015/0220477 A1  Aug. 6, 2015

Related U.S. Application Data

(63) Continuation-in-part of application No. 13/959,713, filed on Aug. 5, 2013, now Pat. No. 9,026,693.

(51) Int. Cl.

| | |
|---|---|
| *G06F 13/00* | (2006.01) |
| *G06F 13/42* | (2006.01) |
| *G06F 13/10* | (2006.01) |
| *G06F 3/06* | (2006.01) |
| *G06F 13/12* | (2006.01) |
| *H04L 12/835* | (2013.01) |
| *G06F 13/28* | (2006.01) |
| *G06F 13/38* | (2006.01) |
| *H04L 12/801* | (2013.01) |

(52) U.S. Cl.
CPC .......... *G06F 13/4221* (2013.01); *G06F 3/0613* (2013.01); *G06F 3/0655* (2013.01); *G06F 3/0683* (2013.01); *G06F 13/10* (2013.01); *G06F 13/124* (2013.01); *H04L 47/30* (2013.01); *G06F 13/28* (2013.01); *G06F 13/385* (2013.01); *H04L 47/10* (2013.01)

(58) Field of Classification Search
CPC ........ G06F 13/385; G06F 13/28; H04L 47/10
See application file for complete search history.

(56) References Cited

U.S. PATENT DOCUMENTS

| | | | |
|---|---|---|---|
| 7,246,181 B2* | 7/2007 | Rosing | G06F 13/14 455/452.23 |
| 7,406,548 B2* | 7/2008 | Owens | G06F 11/24 348/211.9 |

* cited by examiner

*Primary Examiner* — Zachary K Huson

(74) *Attorney, Agent, or Firm* — Renaissance IP Law Group LLP

(57) ABSTRACT

According to one embodiment, filtering cached input/output (I/O) data includes receiving a current I/O transfer that is part of an ongoing data stream, and evaluating whether to filter ongoing data streams once the data stream reaches are particular size threshold. The transfer rate for the ongoing data stream may be calculated and a determination is made as to whether the transfer rate is greater than a throughput associated with a target storage device. The current I/O transfer is cached if the transfer rate is greater than the throughput associated with a target storage device, or is not cached if the transfer rate is not greater than the throughput associated with a target storage device. The current I/O transfer may be also cached if the transfer rate is less than or equal to the throughput associated with the target storage device and the I/O transfer is a write I/O transfer.

20 Claims, 7 Drawing Sheets

METHOD FOR FILTERING CACHED INPUT/OUTPUT DATA BASED ON DATA GENERATION/CONSUMPTION

CROSS-REFERENCE TO RELATED APPLICATION

The present patent application is a continuation-in-part application of U.S. patent application Ser. No. 13/959,713, filed Aug. 5, 2013, the contents of which are incorporated by reference herein.

BACKGROUND

1. Field

This disclosure relates generally to I/O caching, and more particularly to filtering I/O data to be cached based on data generation and consumption.

2. Description of the Related Art

Caching has long been used in storage environments to enhance the performance of slower storage devices, such as disk drives. In caching, a smaller and faster storage medium is utilized to temporarily store and retrieve frequently used data, while the larger and typically slower mass storage medium is used for long term storage of data. One caching methodology is write-back caching, wherein data written to a disk is first stored in a cache and later written to the mass storage device, typically when the amount of data in cache reaches some threshold value or when time permits.

FIG. 1 is a block diagram showing an exemplary prior art computer system 100 having caching capability. The exemplary prior art computer system 100 includes a central processing unit (CPU) 102 in communication with system memory 104, a caching device 106, a local target storage device 108, and a network interface card 110. In addition, loaded into system memory 104 is caching software 112, which functions to facilitate caching functionality on the computer system 100.

As mentioned previously, the caching device 106 generally comprises a smaller, faster access storage than that used for the local target storage device 108. Because of the enhanced speed of the caching device 106, reads and writes directed to the caching device 106 are processed much faster than using the target storage device 108. Caching takes advantage of these differences by sending selected write requests to the caching device 106 before later transferring the data to the local target storage device 108.

For example, when the CPU 102 processes a write request to write data to the target storage device 108, the caching software 112 intercepts the write request and writes the data to the caching device 106 instead. When the CPU 102 processes a read request, the caching software 112 again intercepts the read request and determines whether the data is stored on the caching device 106. If the data is currently stored on the caching device 106, the caching software 112 reads the data from the caching device 106, otherwise the data is read from the local target storage device 108.

Data is selected for caching based on many different factors. For example, prior art approaches include recency, frequency, block sizes, and file types. However, these approaches assume that the data is located and used locally. If the data is not located and used locally, data selection policies based on recency, frequency, block sizes, and file types are far less effective.

For example, in FIG. 1, the computer system 100 is in communication with a remote storage device 114 via the network interface card 110. The remote storage device 114 can be connected to the computer system 100, for example, via the Internet, or other network. In such a remote configuration, data generally takes longer to travel from the remote storage device 114 to the CPU 102 than from the local target storage device 108 to the CPU 102. Thus, in this instance the bottleneck is the connection to the remote storage device 114 and not the throughput of the local target storage device 108.

In view of the foregoing, there is a need for systems and methods for filtering I/O data to be cached to exclude caching data that will not effectively help the user. The systems and methods should be able to determine when caching will be effective and avoid inefficiently caching data.

SUMMARY

Broadly speaking, embodiments of the present disclosure address these needs by providing a method for filtering cached input/output (I/O) based on the generation/consumption rate of the data. In one embodiment, a method for filtering cached input/output (I/O) data is disclosed. The method includes receiving a current I/O transfer. In general, embodiments of the present disclosure evaluate whether to filter ongoing data streams once the data stream reaches are particular size threshold. Hence, in this particular instance, the current I/O transfer is part of an ongoing sequential data stream and the total data transferred as part of the ongoing sequential data stream is greater than the predetermined threshold. The transfer rate for the ongoing sequential data stream then is calculated and a determination is made as to whether the transfer rate is greater than a throughput associated with a target storage device. The current I/O transfer is cached if the transfer rate is greater than the throughput associated with a target storage device, or is not cached if the transfer rate is not greater than the throughput associated with a target storage device. The current I/O transfer is cached on the caching device if the transfer rate is less than or equal to the throughput associated with the target storage device and the I/O transfer is a write I/O transfer.

For example, the transfer rate can be calculated based on a total data transferred as part of the ongoing sequential data stream divided by time taken to transfer the total data transferred as part of the ongoing sequential data stream. As mentioned above, embodiments of the present disclosure evaluate whether to filter ongoing data streams once the data stream reaches are particular size threshold. Hence, if receiving a prior I/O transfer prior to receiving the current I/O transfer, wherein the prior I/O transfer is part of the ongoing sequential data stream if the total data transferred as part of the ongoing sequential data stream is not greater than the predetermined threshold, the prior I/O transfer is cached regardless of the transfer rate of the ongoing sequential data stream.

In some instances, the bottleneck in the system can transfer back to the target storage device, particularly during times of high use. As such, a determination can be made as to if a predetermined number of non-cached ongoing sequential data streams have a current transfer rate less than an associated cached transfer rate. The cached transfer rate is the transfer rate of the associated ongoing sequential data stream if the associated ongoing sequential data stream was being cached. If the predetermined number of non-cached ongoing sequential data streams have a current transfer rate less than an associated cached transfer rate, selected previously non-cached ongoing sequential data streams can be cached. The selected data streams are cached one by one in decreasing order of their associated cached transfer rates until remaining data streams not being cached go back to their respective cached transfer rate.

In a further embodiment, a computer program embodied on a computer readable medium for filtering cached I/O data is disclosed. The computer program includes computer instructions that receive a current I/O transfer. As above, the current I/O transfer is part of an ongoing sequential data stream and a total data transferred as part of the ongoing sequential data stream is greater than a predetermined threshold. Computer instructions also are included that calculate an aggregate transfer rate for the ongoing sequential data stream, as are computer instructions that determine whether the aggregate transfer rate is greater than a throughput associated with a target storage device. The computer program also includes computer instructions that cache the current I/O transfer if the transfer rate is greater than the throughput associated with a target storage device, or do not cache the current I/O transfer if the transfer rate is not greater than the throughput associated with a target storage device. The computer program also includes computer instructions that cache the current I/O transfer on the caching device if the transfer rate is less than or equal to the throughput associated with the target storage device and the I/O transfer is a write I/O transfer.

As mentioned above, the bottleneck in the system can transfer back to the target storage device, particularly during times of high use. As such, computer instructions can be included that determine if a predetermined number of non-cached ongoing sequential data streams have a current transfer rate less than an associated storage device transfer rate. If the predetermined number of non-cached ongoing sequential data streams have a current aggregate transfer rate less than an associated cached transfer rate for each respective non-cached ongoing sequential data stream, selected previously non-cached ongoing sequential data streams can be cached. The selected data streams are cached one by one in decreasing order of their associated cached transfer rates until remaining data streams not being cached go back to their respective cached transfer rate.

In this manner, embodiments of the present disclosure optimally utilize the limited and expensive caching device. Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure, together with further advantages thereof, may best be understood by reference to the following description taken in conjunction with the accompanying drawings in which.

DETAILED DESCRIPTION OF THE PREFERRED EMBODIMENTS

Figure 1:
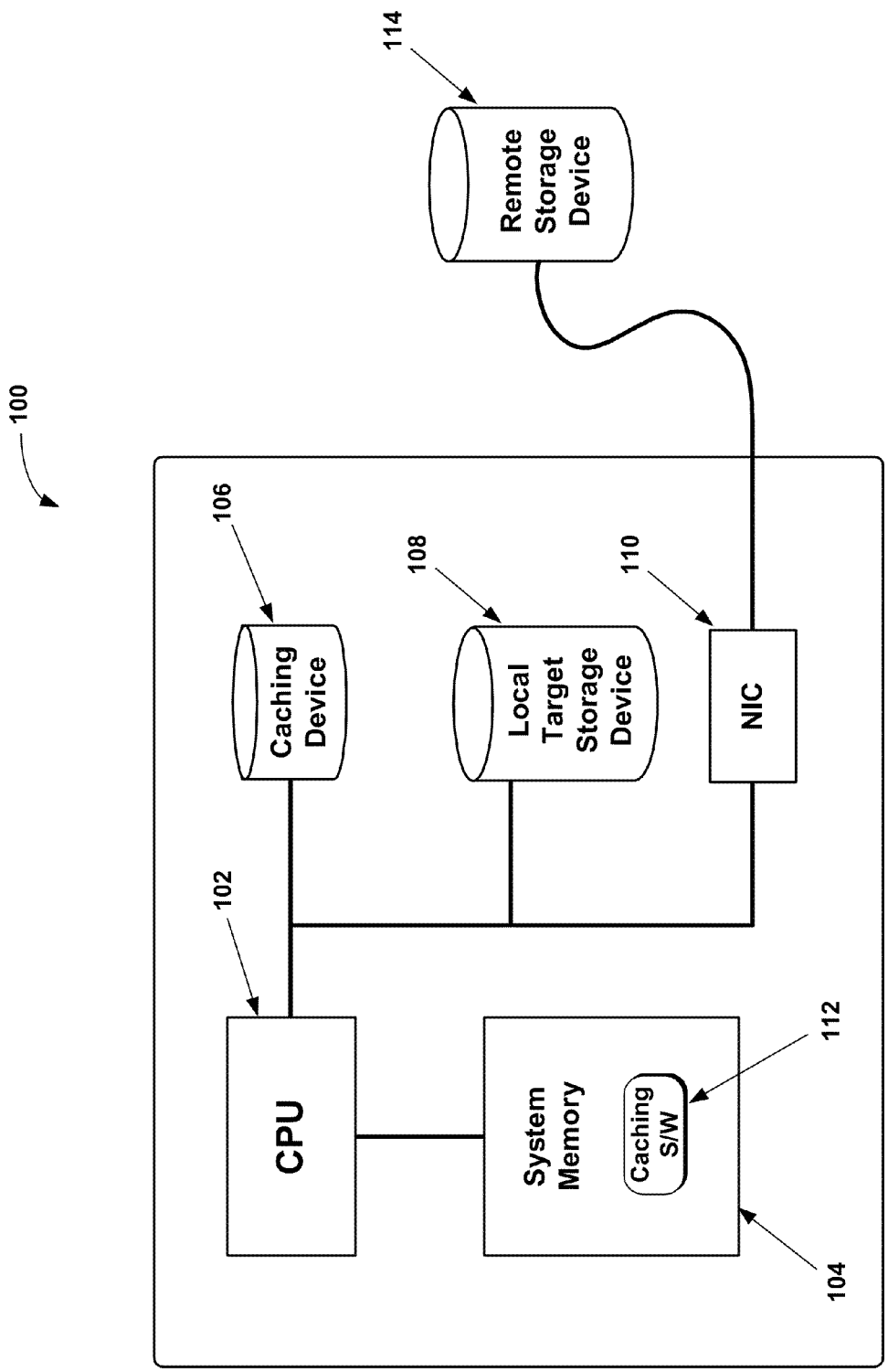
FIG. 1 is a block diagram showing an exemplary prior art computer system having caching capability.

An invention is disclosed for filtering I/O data to be cached based on data generation and consumption. Embodiments of the present disclosure filter out I/O data that has a generation/consumption rate that is slower than the local target storage devices transfer rate, which depends upon the rotational speed of the storage devices platters and the data recording density. In general, after a predetermined threshold is met, data streams having a generation/consumption rate greater than the throughput of the target storage device are cached, while those having a generation/consumption rate less than or equal to the throughput of the target storage device are not cached. Thus, embodiments of the present disclosure utilize the limited and expensive caching device optimally.

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to unnecessarily obscure the present disclosure. Furthermore, it should be noted that the components of the present disclosure may be arranged and designed in a wide variety of different configurations in addition to the described embodiments. Thus, the following more detailed description of the embodiment of the present disclosure, as shown in the drawings, is not intended to limit the scope of the disclosure, as claimed, but is merely representative of selected presently preferred embodiments of the disclosure.

Figure 2:
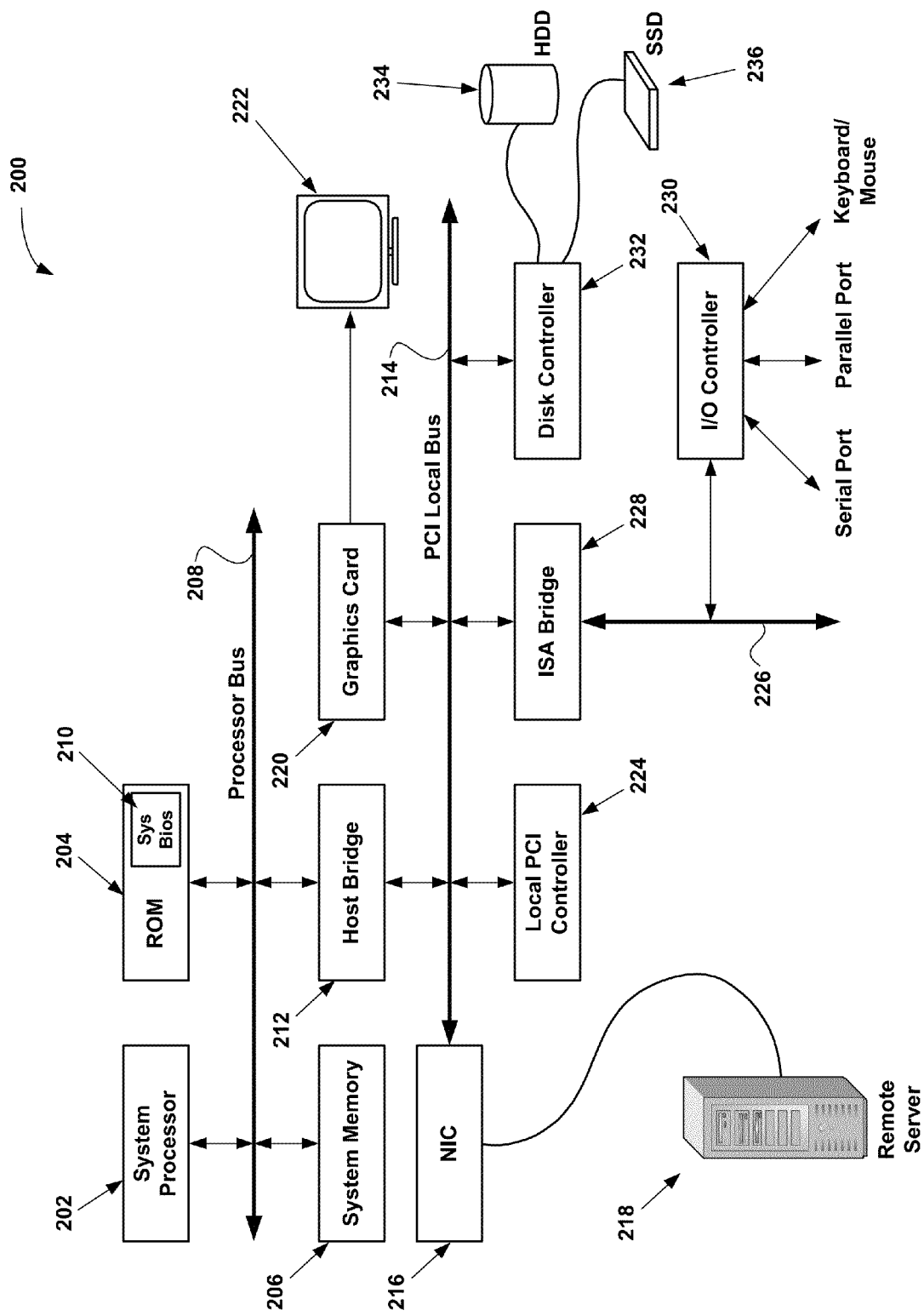
FIG. 2 is a block diagram showing an exemplary computer system, in accordance with an embodiment of the present disclosure.

FIG. 1 was described in terms of the prior art. FIG. 2 is a block diagram showing an exemplary computer system 200, in accordance with an embodiment of the present disclosure. The exemplary computer system 200 includes a system processor 202 coupled to a read-only memory (ROM) 204 and system memory 206 via a processor bus 208. The system processor 202 executes a system BIOS 210 stored within the ROM 204 at power-on and thereafter processes data under the control of an operating system and application software stored in system memory 206. As illustrated in FIG. 2, the system processor 202 can be coupled via the processor bus 208 and host bridge 212 to a peripheral component interconnect (PCI) local bus 214.

The PCI local bus 214 supports the attachment of a number of devices, including adapters and bridges. Among these devices is a network interface controller 216, which interfaces the computer system 200 to a remote server 218, and graphics adapter 220, which interfaces the computer system 200 to a monitor 222. Communication on the PCI local bus 214 is governed by a local PCI controller 224, which can be coupled to additional buses and devices via a second host bridge.

The computer system 200 further includes an industry standard architecture (ISA) bus 226 via an ISA bridge 228. Coupled to the ISA bus 228 is an I/O controller 230, which controls communication between the computer system 200 and attached peripheral devices such as a keyboard and mouse. In addition, the I/O controller 230 supports external communication by the computer system 200 via serial and parallel ports. A disk controller card 232 is in communication with various storage devices. For example, the storage devices can include a local target storage device 234, such as a hard disk drive (HDD), and a caching device 236, such as a solid state drive (SSD), which allows caching of the local target storage device 234.

A fundamental decision to be made for a caching methodology is what data to cache on the caching device 236. For example, when a request is received from the host to write a specific length of data to a specified region starting from a specified LBA to the target storage device 234, known as an I/O transfer, a decision is made as to whether to cache the data on the caching device 236. As mentioned previously, prior art approaches have been based on recency, frequency, and file types. These approaches generally perform adequately when all the data is generated or consumed locally on the same computer system 200 because the system processor 202 and the system memory 206 speeds are many times faster than that of the local target storage device 234. However, these techniques become less useful when handling data that is generated or consumed remotely because the current request size divided by the time elapsed since the last request of the same stream was received, known as the I/O transfer rate, is limited by the remote connection rather than the throughput of the local target storage device 234.

For example, in FIG. 2, much more time is required to download data from the remote server 218 to the local target storage device 234 than is required to store data generated by the system processor 202 on the local target storage device 234. Similarly, much more time is required to upload data from the local target storage device 234 to the remote server 218 than is required to read data locally to the system memory 206. Some embodiments of the present disclosure avoid caching data in these instances because the bottleneck is caused by the connection to the remote server 218 rather than the speed of the local target storage device 234. Some embodiments of the present disclosure cache data in instances in which a write I/O transfer is performed and the transfer rate is less than the available transfer rate of the local target storage device 234, the data is written to both the caching device 236 and the local target storage device 234 because if the data is subsequently read, it can be obtained much quicker from the caching device 236 than from the local target storage device 234. The cached data can be later discarded if additional cache resources are required because the data is available on the local target storage device 234.

Figure 3:
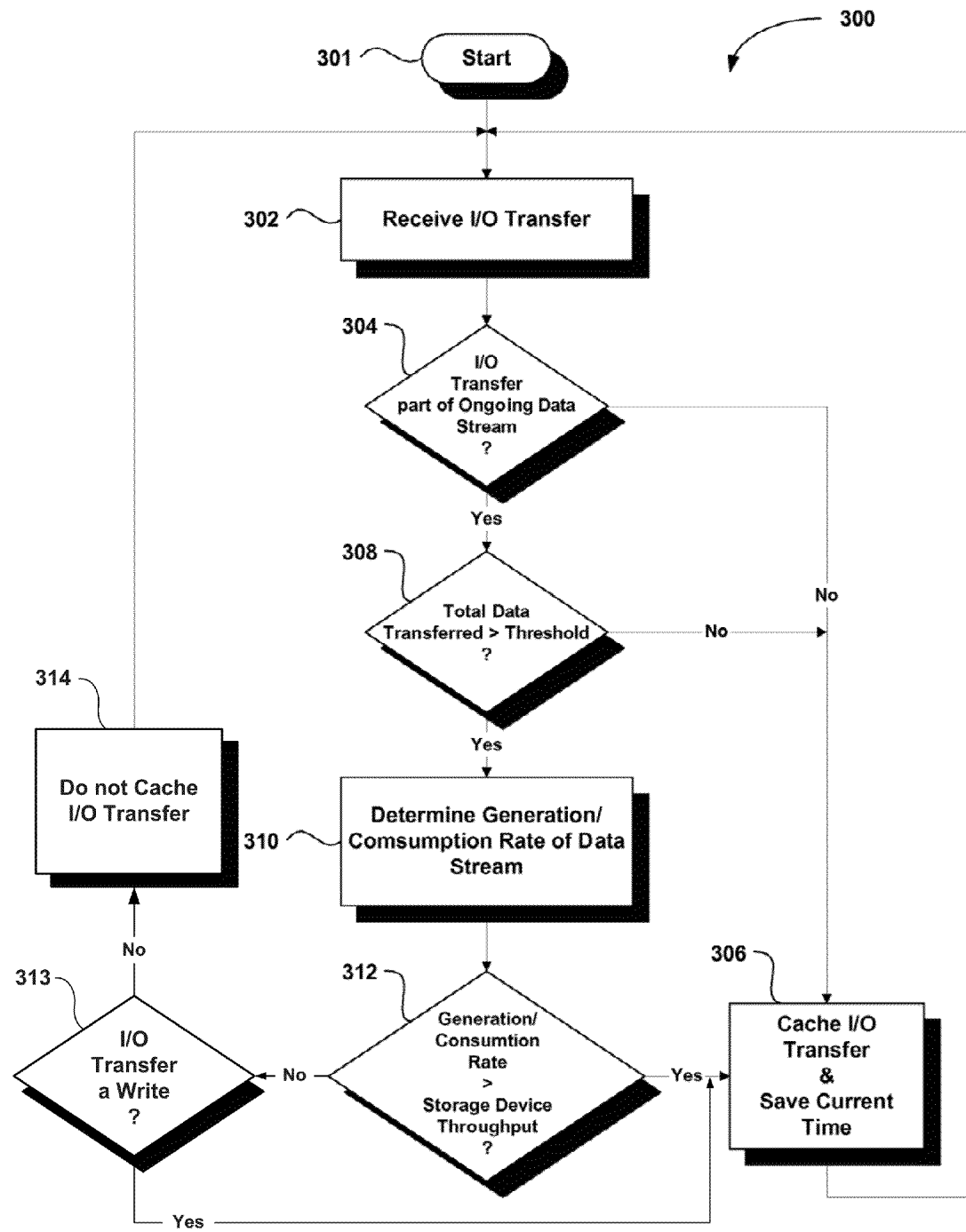
FIG. 3 is a flowchart showing a method for filtering input/output (I/O) data to be cached based on the I/O data generation/consumption rate, in accordance with an embodiment of the present disclosure.

FIG. 3 is a flowchart showing a method 300 for filtering input/output (I/O) data to be cached based on the I/O data generation/consumption rate, in accordance with an embodiment of the present disclosure. In an initial operation 301, preprocess operations are performed. Preprocess operations can include, for example, loading caching software into system memory, establishing connections to remote servers, and other preprocess operations that will be apparent to those skilled in the art with the hindsight provided after a careful reading of the present disclosure.

In general, embodiments of the present disclosure filter out I/O data that has a generation/consumption rate that is slower than the local target storage devices transfer rate, which depends upon the rotational speed of the platters and the data recording density. In this manner, embodiments of the present disclosure cache the data that requires high throughput and filter out data that does not require high throughput because of slow generation/consumption rate. Advantageously, embodiments of the present disclosure optimally utilize the limited and expensive caching device.

In operation 302, an I/O transfer is received. Referring to FIG. 2, during start up caching software is loaded into the system memory 206 to facilitate caching on the computer system 200. In general, the caching software operates to intercept I/O transfers for the local target storage device 234 and determine whether to write the data to the caching device 236, for write I/O transfers, or read the data from the caching device 236, for read I/O transfers. In making such a determination, the caching software detects the transfer rate and length of the sequential data stream associated with the current I/O transfer, if any, as described subsequently.

Figure 4:
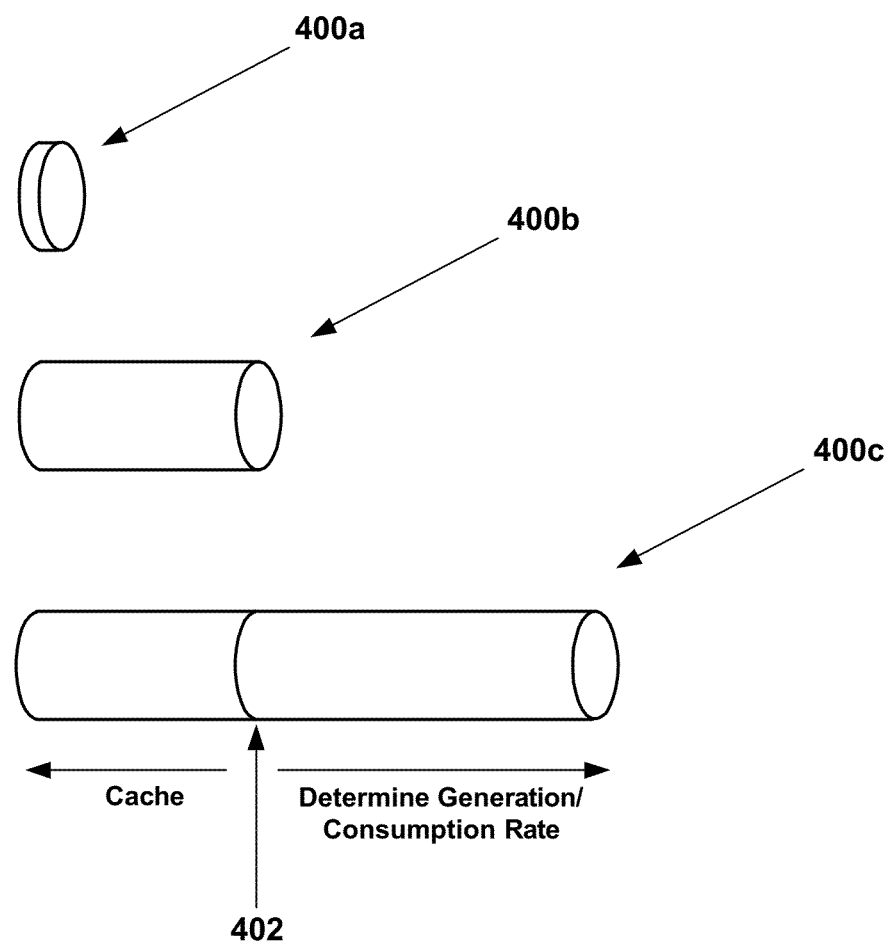
FIG. 4 is a diagram showing visual representations of various data streams, in accordance with an embodiment of the present disclosure.

A decision is then made as to whether the received I/O transfer is part of an ongoing sequential data stream, in operation 304. FIG. 4 is a diagram showing visual representations of various data streams, in accordance with an embodiment of the present disclosure. Data stream 400a represents a new I/O transfer that is not part of an ongoing sequential data stream previously received. Conversely, data stream 400b represents an ongoing sequential data stream previous started. Finally, data stream 400c represents an ongoing sequential data stream that is longer than data stream 400b. That is, data stream 400c represents an ongoing data stream wherein the total data transferred is greater than the total data transferred in data stream 400b.

Turning back to FIG. 3, if the received I/O transfer is not part of an ongoing sequential data stream, the received I/O transfer stored on the caching device and is considered as a new sequential data stream. For example, in FIG. 4, data stream 400a represents a new I/O transfer that is not part of an ongoing sequential data stream previously received. As such, the new I/O transfer is stored on the caching device and data stream 400a is considered as a new sequential data stream. However, if the received I/O transfer is part of an ongoing sequential data stream, the size of the data stream is examined in operation 308.

In operation 306, the received I/O transfer is stored on the caching device along with the current time. Generally, embodiments of the present disclosure cache I/O transfers until it is determined that the I/O transfer is part of a sequential data stream whose generation/consumption rate is slower than the transfer rate of the local target storage device. In addition to the size of the data stream, one of the factors used to determine the transfer rate of the data stream is the difference between the time the data stream started and the time associated with the current I/O transfer. As such, the current time is stored and associated with the received I/O transfer as it is stored on the caching device.

In operation 308, a decision is made as to whether the total data transferred as part of the ongoing sequential data stream is greater than a predetermined threshold size. If the total data transferred as part of the ongoing sequential data stream is greater than a predetermined threshold size, the method 300 continues to operation 310, where the generation/consumption rate of the data stream is determined. Otherwise, the I/O transfer is cached in operation 306.

Referring to FIG. 4, indicia 402 represents a particular predetermined threshold size based on the particular needs of the exemplary system. It should be noted that the predetermined threshold size can be any size and should be determined based on the needs and desired operating performance of the particular computer system on which the embodiments of the present disclosure are being practiced. Data I/O transfers belonging to data stream 400c will be automatically cached until the total data transferred as part of data stream 400c is greater than the predetermined threshold size 402.

Turning back to FIG. 3, the generation/consumption rate of the ongoing data stream to which the I/O transfer belongs is determined, in operation 310. As mentioned previously, the transfer rate of data that is generated remotely, for example a file downloaded from the Internet or an online media stream, generally is much slower than data that is generated locally, for example via the system processor. Similarly, the transfer rate of data that is consumed remotely, for example video/image uploads to a remote server, generally is much slower than data that is consumed locally from the target storage device. As such, embodiments of the present disclosure determine the generation/consumption rate of the ongoing data stream to determine whether to continue to cache the data stream.

The generation/consumption rate is calculated as the total data transferred as part of the ongoing sequential data stream divided by the time taken to transfer the total data transferred as part of the ongoing sequential data stream. The time taken to transfer the total data transferred as part of the ongoing sequential data stream is the difference between the time associated with the current I/O transfer and the time associated with the first I/O transfer of the ongoing sequential data stream.

A decision is then made as to whether the generation/consumption rate of the ongoing sequential data stream is greater than the throughput of the local target storage device, in operation 312. If the generation/consumption rate of the ongoing sequential data stream is greater than the throughput of the local target storage device. then the I/O transfer is cached in operation 306. If the generation/consumption rate of the ongoing sequential data stream is less than or equal to the local target storage device, then a decision is made in operation 313 as to whether the I/O transfer is a write transfer or a read transfer. If the I/O transfer is a write transfer, then the I/O transfer is cached in operation 306. Otherwise, the I/O transfer is not cached, in operation 314.

Figure 5:
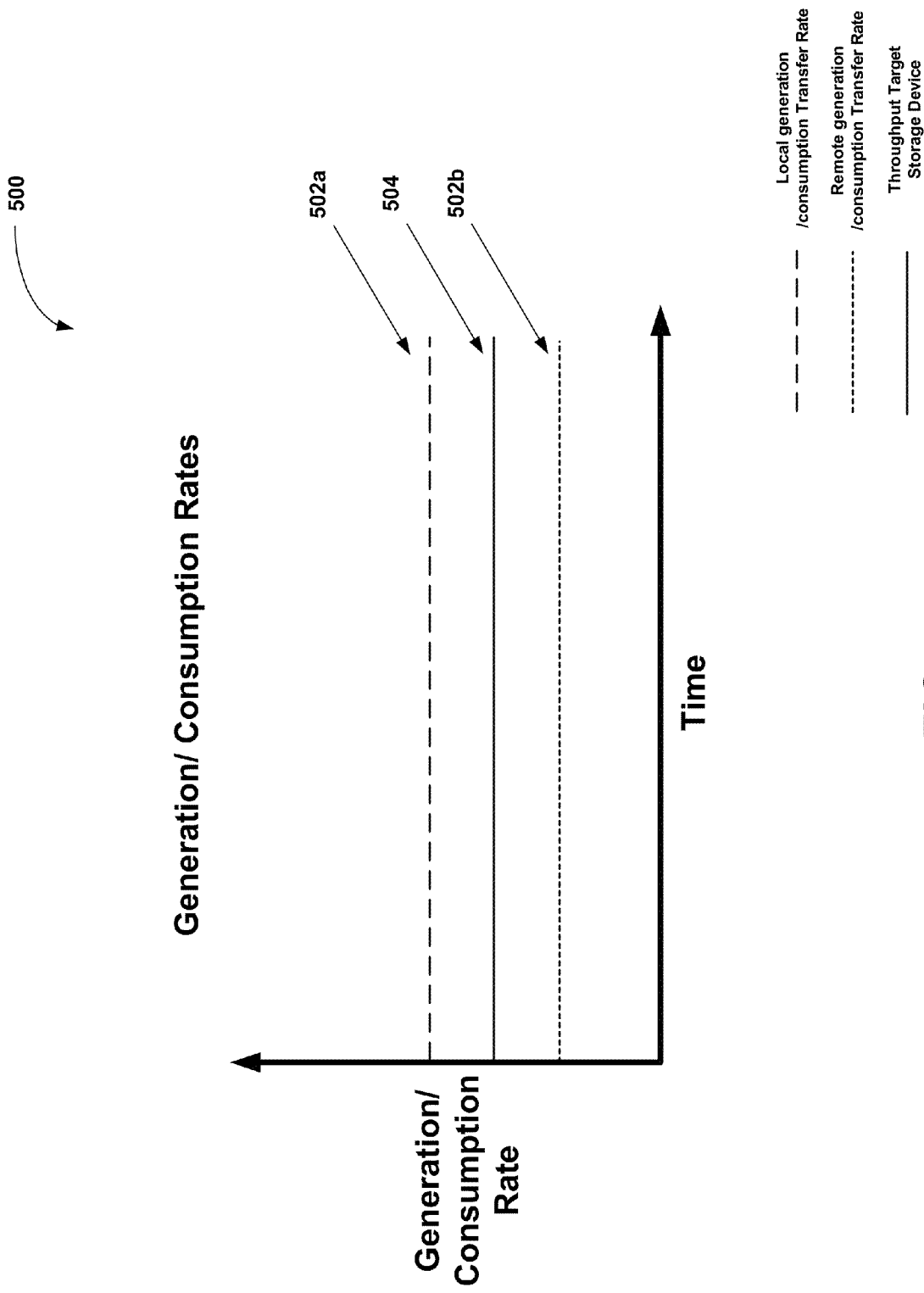
FIG. 5 is a line graph showing various exemplary generation/consumptions rates of ongoing sequential data streams over time, in accordance with an embodiment of the present disclosure.

FIG. 5 is a line graph 500 showing various exemplary generation/consumptions rates of ongoing sequential data streams over time, in accordance with an embodiment of the present disclosure. Specifically, the line graph 500 shows an exemplary generation/consumption rate of locally generated/consumed data 502a and an exemplary generation/consumption rate of remotely generated/consumed data 502b. In addition, the line graph 500 shows an exemplary throughput of a local target storage device 504.

As illustrated in FIG. 5, the generation/consumption rate of locally generated/consumed data 502a is greater than the throughput of the local target storage device 504. Generally, the transfer rate bottleneck in a local computer system is the local target storage device. Thus, the generation/consumption rate of locally generated/consumed data 502a is higher than the throughput of a local target storage device 504 in line graph 500. Because the generation/consumption rate of locally generated/consumed data 502a is higher than the throughput of a local target storage device 504, the data will benefit from being cached and thus the locally generated/consumed data 502a in FIG. 5 is cached.

Conversely, the transfer rate bottleneck in a networked system generally is the remote servers. Thus, the generation/consumption rate of the remotely generated/consumed data 502b is less than the throughput of a local target storage device 504 in line graph 500. Because the generation/consumption rate of the remotely generated/consumed data 502b is less than the throughput of a local target storage device 504, the data will not benefit from being cached and thus the remotely generated/consumed data 502b in FIG. 5 is not cached.

As usage of the computer system changes over time, the throughput of the local target storage device can change. For example, during peak usage periods, the number of I/O requests directed toward the local target storage device can greatly increase. As a result of handling the increased number of I/O requests, the throughput of the local target storage device can decrease. This decrease in throughput may cause the local target storage device to become the bottleneck of the computer system. In such cases, embodiments of the present disclosure change the alter the caching behavior to increase overall system performance, as described next with reference to FIGS. 6 and 7.

Figure 6:
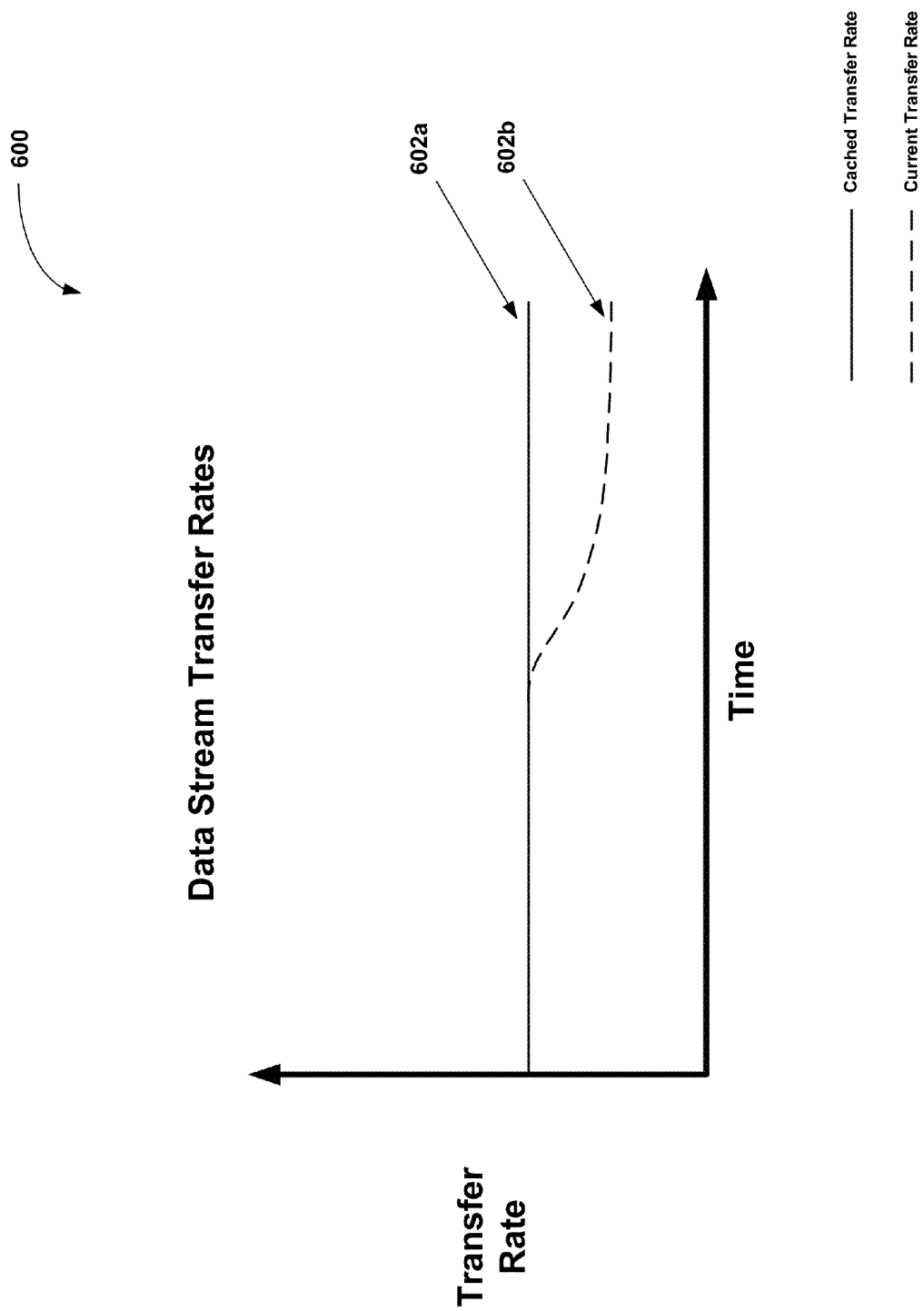
FIG. 6 is a line graph showing data stream transfer rates for an exemplary remotely generated/consumed ongoing sequential data stream, in accordance with an embodiment of the present disclosure.

FIG. 6 is a line graph 600 showing data stream transfer rates for an exemplary remotely generated/consumed ongoing sequential data stream, in accordance with an embodiment of the present disclosure. The data stream transfer rates include a cached transfer rate 602a and a current transfer rate 602b. The cached transfer rate 602a represents the transfer rate of the ongoing sequential data stream when the data stream was being cached. As discussed previously, embodiments of the present disclosure generally cache all I/O transfers of an ongoing sequential data stream until the total data transferred as part of the ongoing sequential data stream reaches a predetermined threshold. Thus, generally all ongoing sequential data streams have a cached transfer rate associated with them which indicates the transfer rate of the ongoing sequential data stream when the data stream was being cached prior to reaching the predetermined threshold in size.

The current transfer rate 602b represents the current transfer rate of the ongoing sequential data stream, including the transfer rate of the ongoing sequential data stream after the data stream reached the predetermined threshold in size. As a result of handling increased numbers of I/O requests, the throughput of the local target storage device can decrease. This decrease in throughput may cause the current transfer rate of an ongoing sequential data stream to drop. For example, in FIG. 6 the current transfer rate 602b of the remotely generated/consumed ongoing sequential data stream begins equal to the cached transfer rate 602a of the remotely generated/consumed ongoing sequential data stream. However, in this example, the current transfer rate 602b drops after a particular period of time. This drop may result, for example, from a drop in the throughput of the local target storage device. When a predetermined number of ongoing sequential data streams experience such a drop, embodiments of the present disclosure begin caching data streams to increase throughput.

Figure 7:
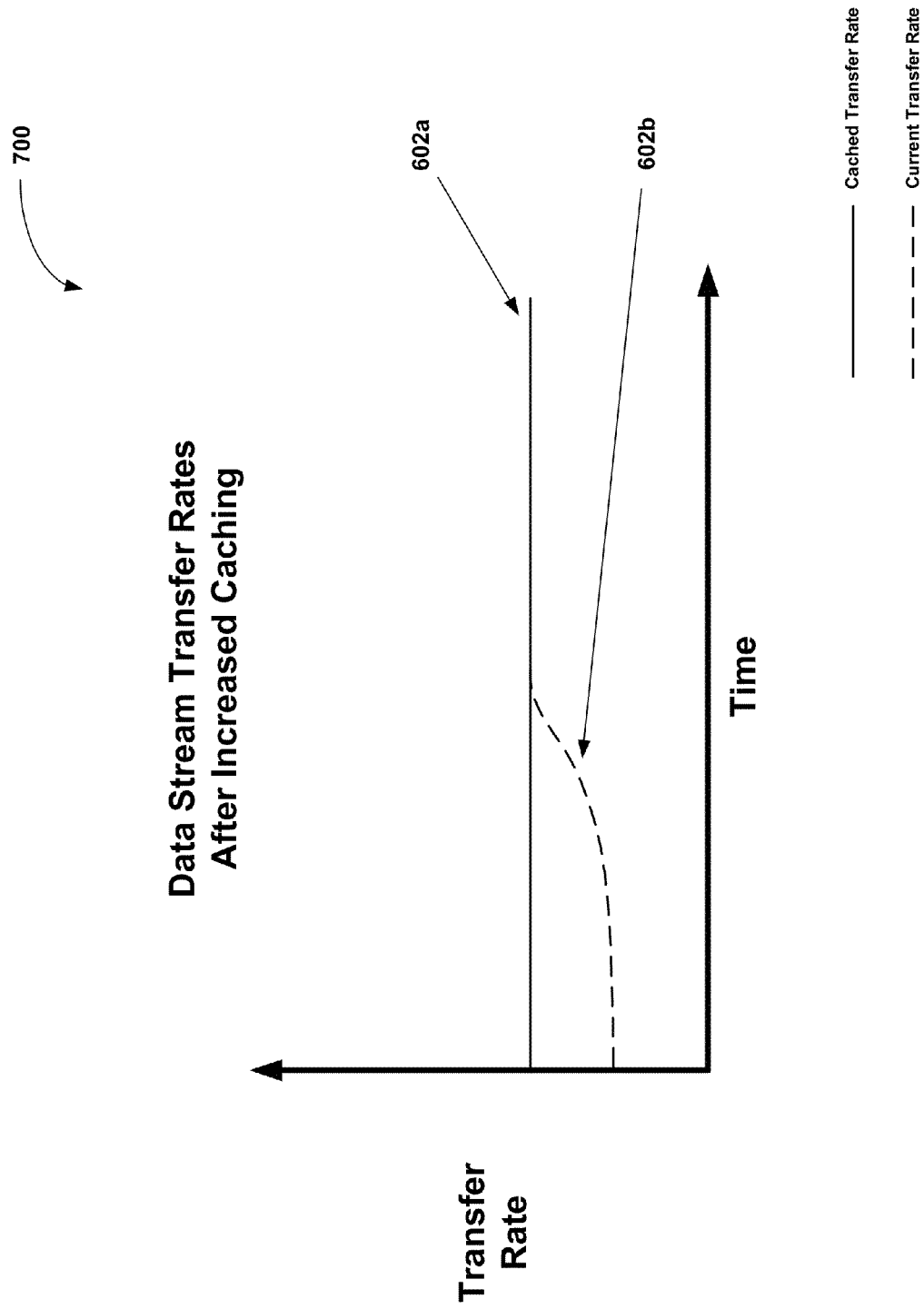
FIG. 7 is a line graph showing data stream transfer rates for the exemplary remotely generated/consumed ongoing sequential data stream of FIG. 6 after increased caching, in accordance with an embodiment of the present disclosure.

FIG. 7 is a line graph 700 showing data stream transfer rates for the exemplary remotely generated/consumed ongoing sequential data stream of FIG. 6 after increased caching, in accordance with an embodiment of the present disclosure. Similar to FIG. 6, the data stream transfer rates illustrated in line graph 700 include the cached transfer rate 602a and a current transfer rate 602b. Embodiments of the present disclosure track the number of ongoing sequential data streams which are not cached due to their slow transfer. In addition, the respective cached transfer rate of each of these non-cached ongoing sequential data streams also is tracked.

As mentioned above, the current transfer rate of a non-cached ongoing sequential data stream can fall below its respective cached transfer rate. When this occurs to a predetermined number of non-cached ongoing sequential data streams, embodiments of the present disclosure begin caching these data streams until the remaining data streams not being cached go back to their cached transfer rate. Specifically, when the current transfer rate of a predetermined number of non-cached ongoing sequential data streams falls below its respective cached transfer rate, non-cached data streams begin to be cached. These data streams are cached one by one in decreasing order of their cached transfer rates until the remaining data streams not being cached go back to their respective cached transfer rate.

For example, in FIG. 7, the current transfer rate 602b of the exemplary ongoing sequential data stream is below its respective cached transfer rate 602a at the time period near the beginning of line graph 700. If this reduced current transfer rate occurs to a predetermined number of non-cached ongoing sequential data streams, the data streams will begin to be cached one by one in decreasing order of their cached transfer rates. After a period of time the current transfer rate 602b of the exemplary ongoing sequential data stream rises back to its respective cached transfer rate 602a. When the current transfer rate of the remaining data streams not being cached goes back to their respective cached transfer rate, cache selection of new ongoing sequential data streams reverts back as described in FIG. 3. Ongoing sequential data streams being cached continue to be cached irrespective of their transfer rate to balance the load on the local target storage device and the caching device.

Although the foregoing disclosure has been described in some detail for purposes of clarity of understanding, it will be apparent that certain changes and modifications may be practiced within the scope of the appended claims. Accordingly, the present embodiments are to be considered as illustrative and not restrictive, and the disclosure is not to be limited to the details given herein, but may be modified within the scope and equivalents of the appended claims.

What is claimed is:

1. A method for filtering cached input/output (I/O) data, comprising:
    receiving a current I/O transfer, wherein the current I/O transfer is part of an ongoing sequential data stream and a total data transferred as part of the ongoing sequential data stream is greater than a predetermined threshold;
    calculating a transfer rate for the ongoing sequential data stream;
    determining whether the transfer rate is greater than a throughput associated with a target storage device;
    caching the current I/O transfer on a caching device if the transfer rate is greater than the throughput associated with a target storage device, OR not caching the current I/O transfer if the transfer rate is not greater than the throughput associated with a target storage device; and
    caching the current I/O transfer on the caching device if the transfer rate is less than or equal to the throughput associated with the target storage device and the I/O transfer is a write I/O transfer.

2. A method as recited in claim 1, wherein the transfer rate is calculated based on a total data transferred as part of the ongoing sequential data stream divided by time taken to transfer the total data transferred as part of the ongoing sequential data stream.

3. A method as recited in claim 1, further comprising receiving a prior I/O transfer prior to receiving the current I/O transfer, wherein the prior I/O transfer is part of the ongoing sequential data stream if the total data transferred as part of the ongoing sequential data stream is less than the predetermined threshold.

4. A method as recited in claim 3, further comprising caching the prior I/O transfer regardless of the transfer rate of the ongoing sequential data stream.

5. A method as recited in claim 1, further comprising determining if a predetermined number of non-cached ongoing sequential data streams have a current transfer rate less than an associated cached transfer rate, wherein the cached transfer rate is a transfer rate of the associated ongoing sequential data stream if the associated ongoing sequential data stream was being cached.

6. A method as recited in claim 5, further comprising caching selected previously non-cached ongoing sequential data streams if the predetermined number of non-cached ongoing sequential data streams have a current transfer rate less than an associated cached transfer rate.

7. A method as recited in claim 6, wherein the selected previously non-cached ongoing sequential data streams are cached one by one in decreasing order of their associated cached transfer rates until remaining data streams not being cached go back to their respective cached transfer rate.

8. A computer program embodied on a non-transitory computer-readable medium for filtering cached input/output (I/O) data, comprising:
    computer instructions that receive a current I/O transfer, wherein the current I/O transfer is part of an ongoing sequential data stream and a total data transferred as part of the ongoing sequential data stream is greater than a predetermined threshold;
    computer instructions that calculate a transfer rate for the ongoing sequential data stream;
    computer instructions that determine whether the transfer rate is greater than a throughput associated with a target storage device
    computer instructions that cache the current I/O transfer on a caching device if the transfer rate is greater than the throughput associated with a target storage device, OR do not cache the current I/O transfer if the transfer rate is not greater than the throughput associated with a target storage device; and
    computer instructions that cache the current I/O transfer on the caching device if the transfer rate is less than or equal to the throughput associated with the target storage device and the I/O transfer is a write I/O transfer.

9. A computer program as recited in claim 8, wherein the transfer rate is calculated based on a total data transferred as part of the ongoing sequential data stream divided by time taken to transfer the total data transferred as part of the ongoing sequential data stream.

10. A computer program as recited in claim 8, further comprising computer instructions that receive a prior I/O transfer prior to receiving the current I/O transfer, wherein the prior I/O transfer is part of an ongoing sequential data stream if the total data transferred as part of the ongoing sequential data stream is less than the predetermined threshold.

11. A computer program as recited in claim 10, further comprising computer instructions that cache the prior I/O transfer regardless of the transfer rate of the ongoing sequential data stream.

12. A computer program as recited in claim 8, further comprising computer instructions that determine if a predetermined number of non-cached ongoing sequential data streams have a current aggregate transfer rate less than an associated cached transfer rate for each respective non-cached ongoing sequential data stream, wherein the current aggregate transfer rate is a transfer rate of the associated ongoing sequential data stream if the associated ongoing sequential data stream was being cached.

13. A computer program as recited in claim 12, further comprising computer instructions that cache selected previously non-cached ongoing sequential data streams if the predetermined number of non-cached ongoing sequential data streams have a current transfer rate less than an associated cached transfer rate.

14. A computer program as recited in claim 13, wherein the selected previously non-cached ongoing sequential data streams are cached one by one in decreasing order of their associated cached transfer rates until remaining data streams not being cached go back to their respective cached transfer rate.

15. A method for filtering cached input/output (I/O) data, comprising:
- receiving an I/O transfer, wherein the I/O transfer is part of an ongoing sequential data stream if a total data transferred as part of the ongoing sequential data stream is not greater than a predetermined threshold;
- caching the I/O transfer on a caching device regardless of a transfer rate of the ongoing sequential data stream;
- receiving a current I/O transfer, wherein the current I/O transfer is part of the ongoing sequential data stream if the total data transferred as part of the ongoing sequential data stream is greater than the predetermined threshold;
- calculating a transfer rate for the ongoing sequential data stream;
- determining whether the transfer rate is greater than a throughput associated with a target storage device;
- caching the current I/O transfer on a caching device if the transfer rate is greater than the throughput associated with a target storage device, OR not caching the current I/O transfer if the transfer rate is not greater than the throughput associated with a target storage device; and
- caching the current I/O transfer on the caching device if the transfer rate is less than or equal to the throughput associated with the target storage device and the I/O transfer is a write I/O transfer.

16. A method as recited in claim 15, wherein the transfer rate is calculated based on a total data transferred as part of the ongoing sequential data stream divided by time taken to transfer the total data transferred as part of the ongoing sequential data stream.

17. A method as recited in claim 15, further comprising determining if a predetermined number of non-cached ongoing sequential data streams have a current aggregate transfer rate less than an associated cached transfer rate for each respective non-cached ongoing sequential data stream, wherein the current aggregate transfer rate is a transfer rate of the associated ongoing sequential data stream if the associated ongoing sequential data stream was being cached.

18. A method as recited in claim 17, further comprising caching selected previously non-cached ongoing sequential data streams if the predetermined number of non-cached ongoing sequential data streams have a current transfer rate less than an associated cached transfer rate.

19. A method as recited in claim 18, wherein the selected previously non-cached ongoing sequential data streams are cached one by one in decreasing order of their associated cached transfer rates until remaining data streams not being cached go back to their respective cached transfer rate.

20. A method as recited in claim 19, further comprising maintaining caching of cached ongoing sequential data streams regardless of their current transfer rate, whereby a load on the target storage device and a caching device is balanced.

\* \* \* \* \*